(12) United States Patent
Macias et al.

(10) Patent No.: US 9,554,231 B2
(45) Date of Patent: Jan. 24, 2017

(54) ENTERPRISE FEMTOCELL SIGNALING

(75) Inventors: John F. Macias, Antelope, CA (US);
David Chiang, Fremont, CA (US);
Mingxing Li, San Jose, CA (US);
James F. Mathison, Warren, NJ (US);
Said Hanbaly, Annandale, NJ (US)

(73) Assignees: Verizon Patent and Licensing Inc.,
Basking Ridge, NJ (US); Cellco Partnership, Basking Ridge, NJ (US)

( * ) Notice: Subject to any disclaimer, the term of this patent is extended or adjusted under 35 U.S.C. 154(b) by 87 days.

(21) Appl. No.: 12/906,484

(22) Filed: Oct. 18, 2010

(65) Prior Publication Data
US 2012/0094658 A1    Apr. 19, 2012

(51) Int. Cl.
| H04W 4/00 | (2009.01) |
| H04W 48/18 | (2009.01) |
| H04W 84/04 | (2009.01) |

(52) U.S. Cl.
CPC .............. *H04W 4/001* (2013.01); *H04W 48/18* (2013.01); *H04W 84/045* (2013.01)

(58) Field of Classification Search
CPC ..... H04W 84/045; H04W 48/18; H04W 4/001
USPC ..... 370/310.2, 328, 331, 338; 455/405, 406, 455/426.1, 432.1, 435.1, 435.2, 436, 437, 438, 455/442, 443, 444, 507
See application file for complete search history.

(56) References Cited

U.S. PATENT DOCUMENTS

| 2005/0233749 A1* | 10/2005 | Karaoguz et al. ............. 455/442 |
| 2008/0133124 A1 | 6/2008 | Sarkeshik |
| 2009/0021641 A1 | 1/2009 | Matsuura et al. |
| 2009/0164547 A1* | 6/2009 | Ch'ng et al. .................. 709/201 |
| 2009/0296641 A1 | 12/2009 | Bienas et al. |
| 2009/0311987 A1 | 12/2009 | Edge et al. |
| 2010/0112982 A1 | 5/2010 | Singh et al. |
| 2010/0208703 A1* | 8/2010 | Tinnakornsrisuphap et al. ............................. 370/331 |
| 2010/0255848 A1* | 10/2010 | Abraham et al. ............. 455/446 |
| 2010/0285785 A1* | 11/2010 | Wang et al. .................. 455/418 |
| 2011/0053609 A1 | 3/2011 | Choi-Grogan |
| 2011/0212729 A1* | 9/2011 | Li et al. ........................ 455/450 |

* cited by examiner

*Primary Examiner* — Dinh P Nguyen

(57) ABSTRACT

A mobile device sends a request for a unique wireless network session identifier and receives, based on the request, the unique wireless network session identifier. The mobile device determines whether the unique wireless network session identifier includes a femtocell identifier. The mobile device applies one set of configuration settings when the unique wireless network session identifier includes the femtocell identifier, and applies a different set of configuration settings when the unique wireless network session identifier does not include the femtocell identifier.

20 Claims, 14 Drawing Sheets

US 9,554,231 B2

ENTERPRISE FEMTOCELL SIGNALING

BACKGROUND

In wireless data networks, the physical network may include traditional wireless communication stations (macro cell base stations) installed at fixed locations and used to communicate with the wireless access terminals. Another type of base station, called a femtocell, may also be used in such networks. A femtocell may be a small form factor wireless base station, typically designed for use in a home or small business. The femtocell may connect to a service provider's network via broadband (such as DSL or cable). The femtocell may allow service providers to extend service coverage indoors, especially where access would otherwise be limited or unavailable. Currently, there is no mechanism to specifically distinguish, to the access terminal, data services provided through a femtocell and data services provided through a macro cell base station.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may distinguish, for a mobile device, data services provided through a femtocell and data services provided through a macro cell base station. Mobile devices may receive a femtocell use indicator included within a unicast access terminal identifier (UATI), or another unique wireless network session identifier, that can enable femtocell-specific behavior. In one implementation, the mobile device may use the femtocell indication to display a visual icon to announce that the mobile device is connected to a femtocell, and not a macro cell. In another implementation, the mobile device may use the femtocell indication to offer options for service and/or usage behavior (e.g., differentiated pricing) based on whether the network coverage is provided by a femtocell or a macro cell.

As used herein, the terms "subscriber" and/or "user" may be used interchangeably. Also, the terms "subscriber" and/or "user" are intended to be broadly interpreted to include a mobile device or a user of a mobile device.

Figure 1:
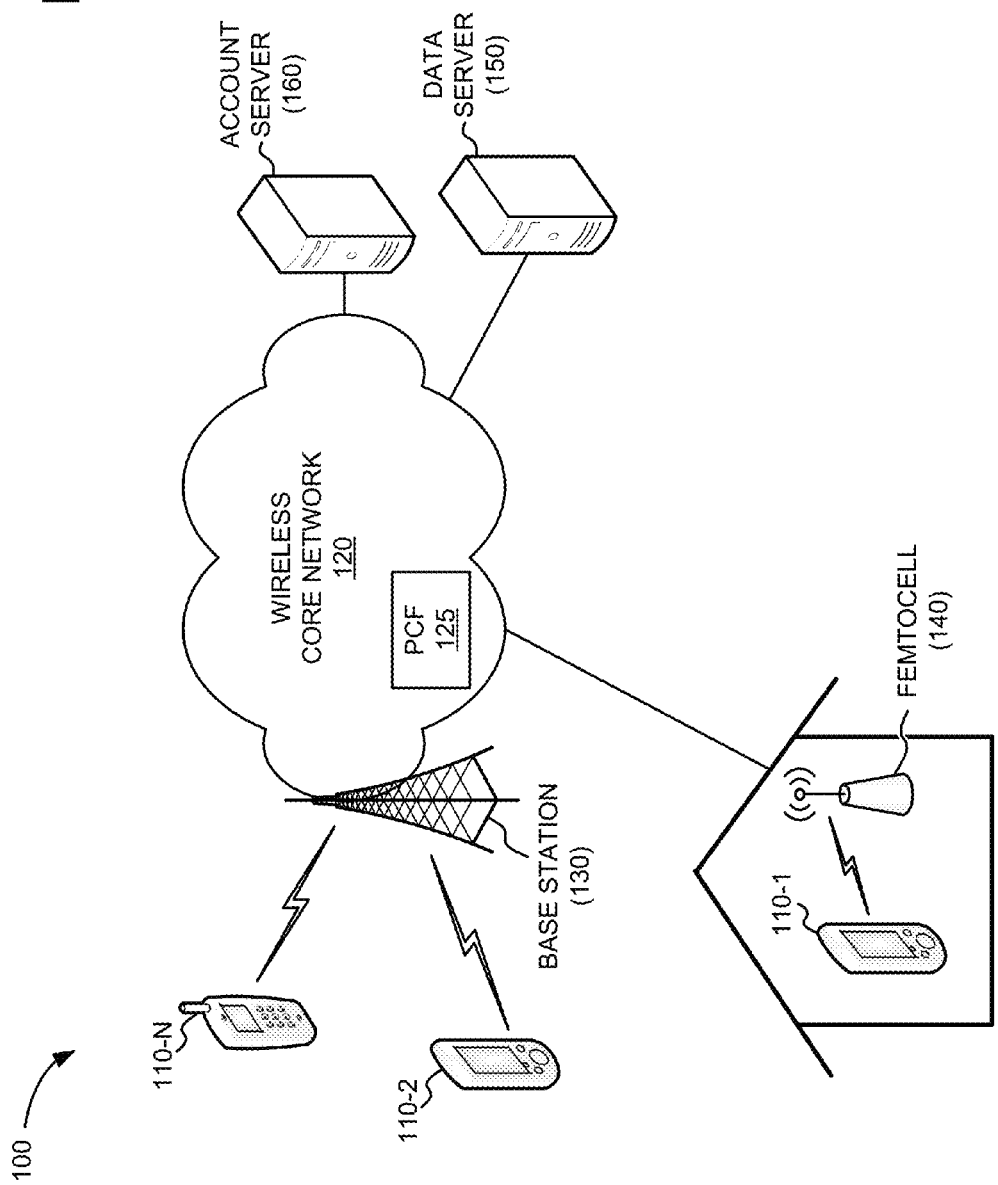
FIG. 1 is a diagram of an example network in which systems and/or methods described herein may be implemented.

FIG. 1 is a diagram of an example network 100 in which systems and/or methods described herein may be implemented. Network 100 may generally illustrate a wireless communication system based on the Evolution-Data Optimized (EVDO) mobile communication standard. In alternative implementations, other communication standards could be used.

As illustrated, network 100 may include multiple mobile devices 110-1, 110-2, . . . , 110-N (referred to herein collectively as "mobile devices 110" or generically as "mobile device 110"); a wireless core network 120, including a packet control function (PCF 125); a base station 130; a femtocell 140; a data server 150; and an account server 160. Components of network 100 may interconnect via wired and/or wireless connections. Three mobile devices 110, one wireless core network 120, one PCF 125, one base station 130, one femtocell 140, one data server 150, and one account server 160 have been illustrated in FIG. 1 for simplicity. In practice, there may be more mobile devices 110, networks 120, PCFs 125, base stations 130, femtocells 140, data servers 150, and/or account servers 160.

Mobile device 110 may include a device capable of transmitting and receiving data (e.g., voice, text, images, and/or multimedia data) over wireless core network 120. For example, mobile device 110 may be a self-contained data device, such as a mobile telephone, a smart phone, an electronic notepad, a personal digital assistant (PDA), etc. In another implementation, mobile device 110 may be connected to a computing device, such as laptop or personal computer. Mobile devices 110 may establish wireless communication sessions with base stations 130 or femtocells 140 using identical protocols. The wireless communication sessions may be used for voice (e.g., telephone calls) or data sessions.

Wireless core network 120 may include components to implement the core network of the EVDO standard. One implementation of such a core network includes the Evolved Packet Core (EPC) architecture. In other implementations, other network technologies, such as other International Mobile Telecommunications-2000 ("3G"), or second-generation wireless telephone technology ("2G"), may be implemented instead of or in addition to EVDO. Components within wireless core network 120 may generally be connected over wired or wireless IP-based connections.

PCF 125 may include an entity that manages the relay of packets between either base station 130 or femtocell 140 and another node within network 120, such as a packet data serving node (PDSN). Network 120 may include multiple PCFs 125. In one implementation, PCF 125 may assign, to mobile device 110, a UATI that is sent, via either base station 130 or femtocell 140, to mobile device 110. In an implementation, one PCF 125 can support multiple base stations 130 or femtocells 140. In another implementation, a separate PCF 125 may be used for each base station 130 and/or femtocell 140.

Base station 130 may represent a base station designed to provide wireless communication service (e.g., an access network) to a relatively large area and simultaneously serve a relatively large number of mobile devices 110. Base station 130 may also be referred to herein as a "macro cell" or a "macro cell base station."

Femtocell 140 may include a device designed to be placed within a residence or small business setting and may connect to wireless core network 120 via a wired broadband connection. Femtocell 140 may act as a base station for a limited set of active mobile devices, such as up to four simultaneous mobile devices. In some instances, femtocell 140 may be self-installed by end-users in the residences or business of the end-users. In an implementation described herein, femtocell 140 may establish wireless communication sessions using the same protocols as that of base station 130, but also providing a femtocell identifier that may be detected by mobile device 110.

Although mobile devices 110-2 through 110-N are shown in FIG. 1 as connecting to base station 130 and mobile device 110-1 is shown as connecting to femtocell 140, mobile devices 110 may generally connect to either base station 130 or femtocell 140 (e.g., depending on the location of each mobile device 110). In a typical implementation, mobile device 110 may connect to femtocell 140 when mobile device 110 is within range of femtocell 140. When mobile device 110 moves out of range of femtocell 140, mobile device 110 may switch the connection to base station 130, where the switch is ideally performed without interrupting the communication session of mobile device 110.

Data server 150 may include one or more server devices, or other types of computation or communication devices, that gather, process, search, and/or provide information in a manner described herein. In one implementation, data server 150 may include a computer system, a server device, a cable head-end, and/or a broadcasting device capable of providing data (e.g., video content, applications, file downloads, advertising, instructions, images, voice content (e.g., voice over IP (VoIP)), application data, and/or other information) to mobile device 110.

Account server 160 may include one or more server devices, or other types of computation or communication devices, that gather, process, search, and/or provide information in a manner described herein. In one implementation, account server 160 may receive and store account information associated with mobile devices 110. Account information may include, for example, pricing plan information that differentiates between femtocell usage and macro cell usage. In one implementation, some of the account information may be provided (e.g., via base station 130 or femtocell 140) to mobile device 110 to enable mobile device 110 to identify differences in pricing for femtocell usage and macro cell usage. Account server 160 may also monitor data transfers to/from mobile device 110 and differentiate between data transfers provided to/from mobile device 110 via a femtocell (e.g., femtocell 140) and data transfers provided to/from mobile device 110 via a macro cell base station (e.g., base station 130).

In an implementation described herein, mobile device 110 may include capabilities to interpret femtocell indicators received from femtocell 140. Components of network 100 may differentiate between network services provided via macro cell 130 and network services provided via femtocell 140. In one implementation, mobile device 110 may provide indications (e.g., visual and/or audible indications), to a user, to distinguish femtocell-based services from macro-cell based services. In another implementation, mobile device 110 may implement behaviors to shift data usage patterns to prefer one access network (e.g., femtocell 140) over another access network (e.g., base station 130).

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
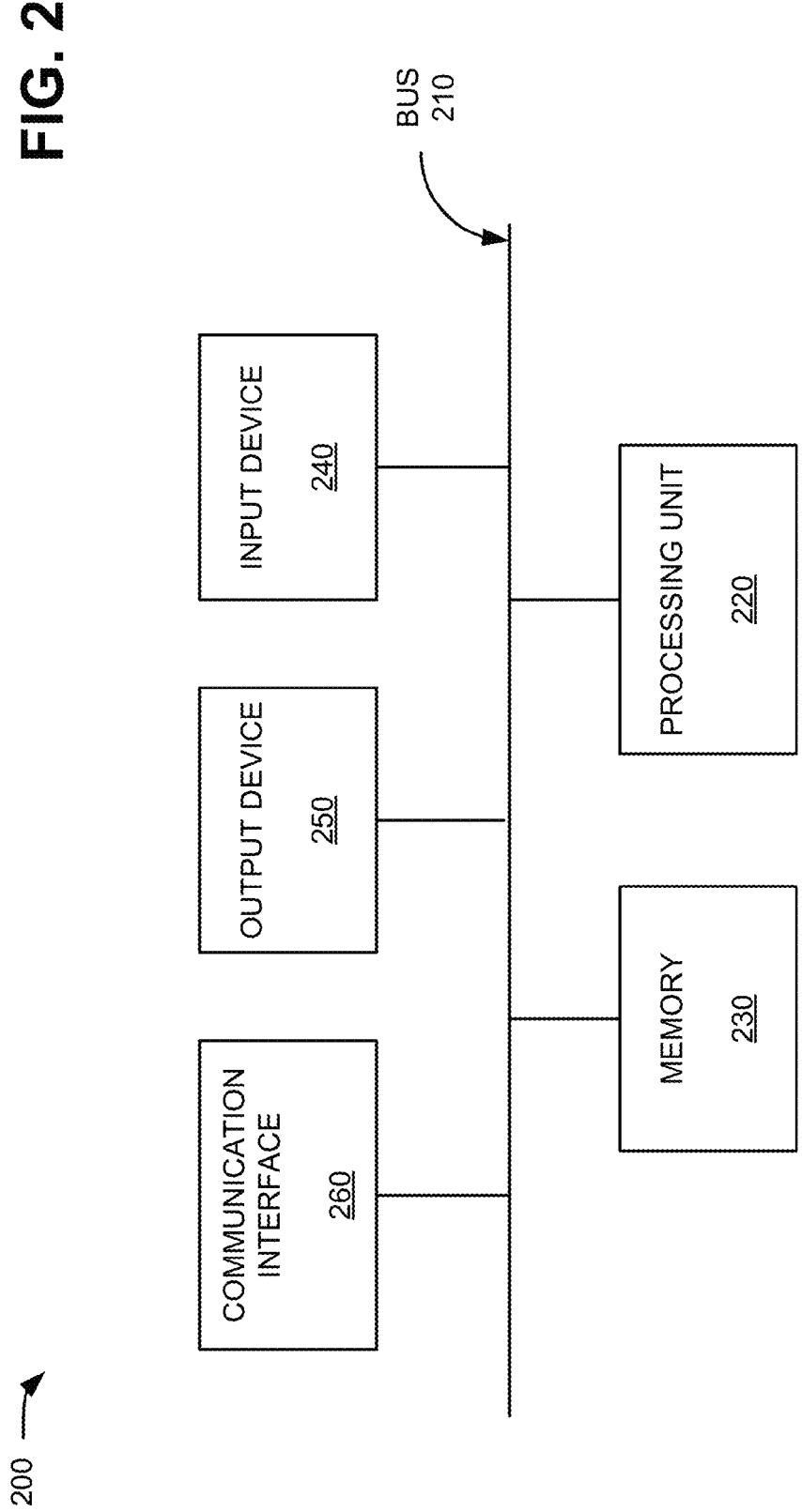
FIG. 2 is a diagram of example components of a base station, a femtocell, a data server, or an account server of FIG. 1.

FIG. 2 is a diagram of example components of a device 200 that may correspond to one or more of PCF 125, base station 130, femtocell 140, data server 150, or account server 160. Each of PCF 125, base station 130, femtocell 140, data server 150, and account server 160 may include one or more device 200. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, or the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
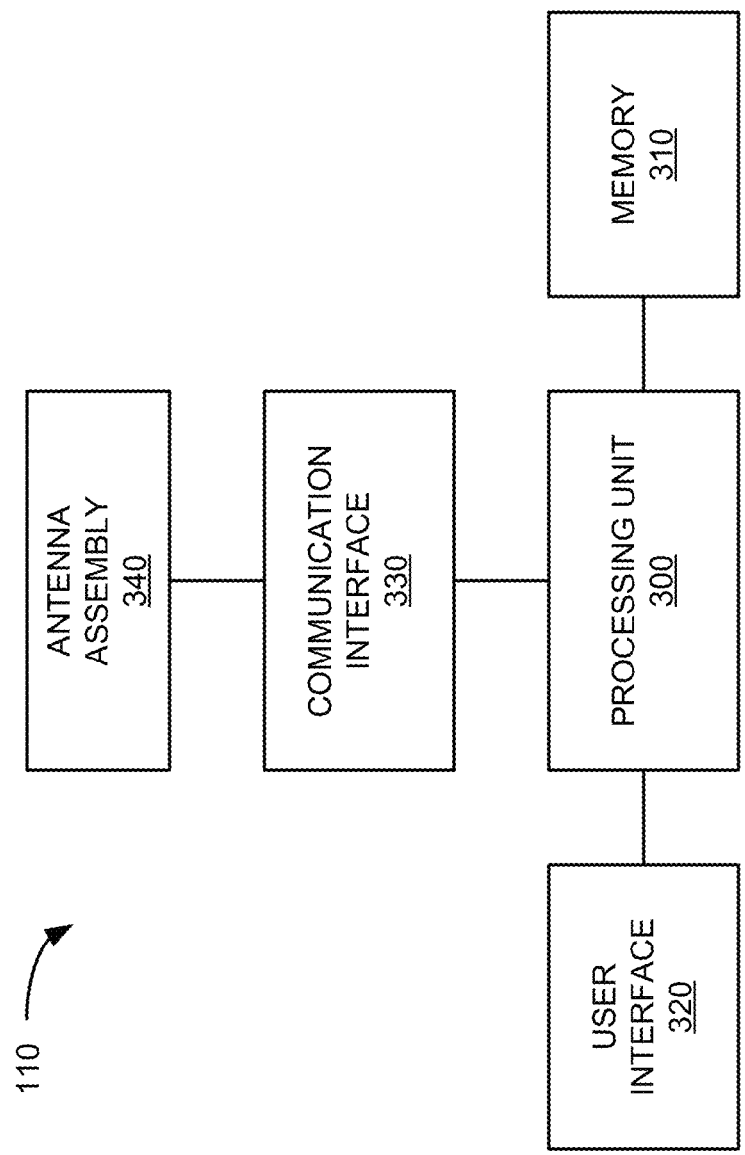
FIG. 3 is a diagram of example components of a mobile device depicted in FIG. 1.

FIG. 3 is a diagram of example components of mobile device 110. As illustrated, mobile device 110 may include a processing unit 300, a memory 310, a user interface 320, a communication interface 330, and/or an antenna assembly 340.

Processing unit 300 may include one or more processors, microprocessors, application specific integrated circuits (ASICs), field programmable gate arrays (FPGAs), or the like. Processing unit 300 may control operation of mobile device 110 and its components. In one implementation, processing unit 300 may control operation of components of mobile device 110 in a manner described herein.

Memory 310 may include a random access memory (RAM), a read-only memory (ROM), and/or another type of memory to store data and instructions that may be used by processing unit 300.

User interface 320 may include mechanisms for inputting information to mobile device 110 and/or for outputting information from mobile device 110. Examples of input and output mechanisms might include buttons (e.g., control buttons, keys of a keypad, a joystick, etc.) or a touch screen interface to permit data and control commands to be input into mobile device 110; a speaker to receive electrical signals and output audio signals; a microphone to receive audio signals and output electrical signals; and/or a display to output visual information (e.g., text input into mobile device 110).

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate, via antenna assembly 340, with a network and/or devices connected to a network (e.g., network 120).

As will be described in detail below, mobile device 110 may perform certain operations in response to processing unit 300 executing software instructions of an application contained in a computer-readable medium, such as memory 310. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of mobile device 110, in other implementations, mobile device 110 may contain fewer, different, differently arranged, or additional components than depicted in FIG. 3. In still other implementations, one or more components of mobile device 110 may perform one or more other tasks described as being performed by one or more other components of mobile device 110.

Figure 4:
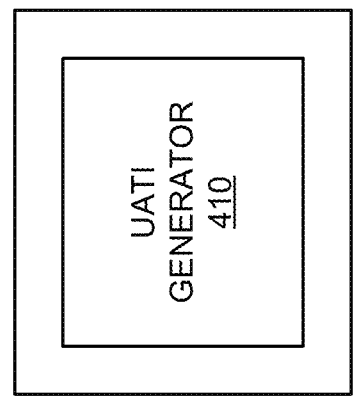
FIG. 4 is a diagram of example functional components of a femtocell depicted in FIG. 1.

FIG. 4 is a diagram of an example functional component of PCF 125. In one implementation, the functions described in connection with FIG. 4 may be performed by one or more components of device 200 (FIG. 2). As shown in FIG. 4, PCF 125 may include a UATI generator 410.

UATI generator 410 may include hardware or a combination of hardware and software to assign a UATI that includes a femtocell identifier. In a 3G telecommunications network, such as an Evolution-Data Optimized (EVDO) network, each mobile device 110 (or access terminal) may be assigned a UATI. The UATI is a universally unique 128-bit address used to address mobile device 110 when a base station (e.g., base station 130 or femtocell 140) sends messages to mobile device 110. Whenever mobile device 110 crosses a subnet (e.g., the footprint of an access network defined by the range of a base station or femtocell), mobile device 110 may send a UATI request message that may be received by the corresponding base station and forwarded to PCF 125. While implementations described herein are primarily described in the context of a UATI, in other implementations, another unique wireless network session identifier may be used.

In response to the UATI request, UATI generator 410 may assign a unique UATI that includes a femtocell identifier. In one implementation, the femtocell identifier may be a two-bit value common to all femtocell identifiers with a service provider's network. The femtocell identifier may be included within a particular location of the UATI so that mobile device 110 may detect the femtocell identifier and, for example, notify a user that mobile device 110 is connected to a femtocell (e.g., in contrast to a macro cell).

Although FIG. 4 shows an example functional component of PCF 125, in other implementations, PCF 125 may include different functional components, differently arranged functional components, and/or additional functional components than depicted in FIG. 4.

Figure 5:
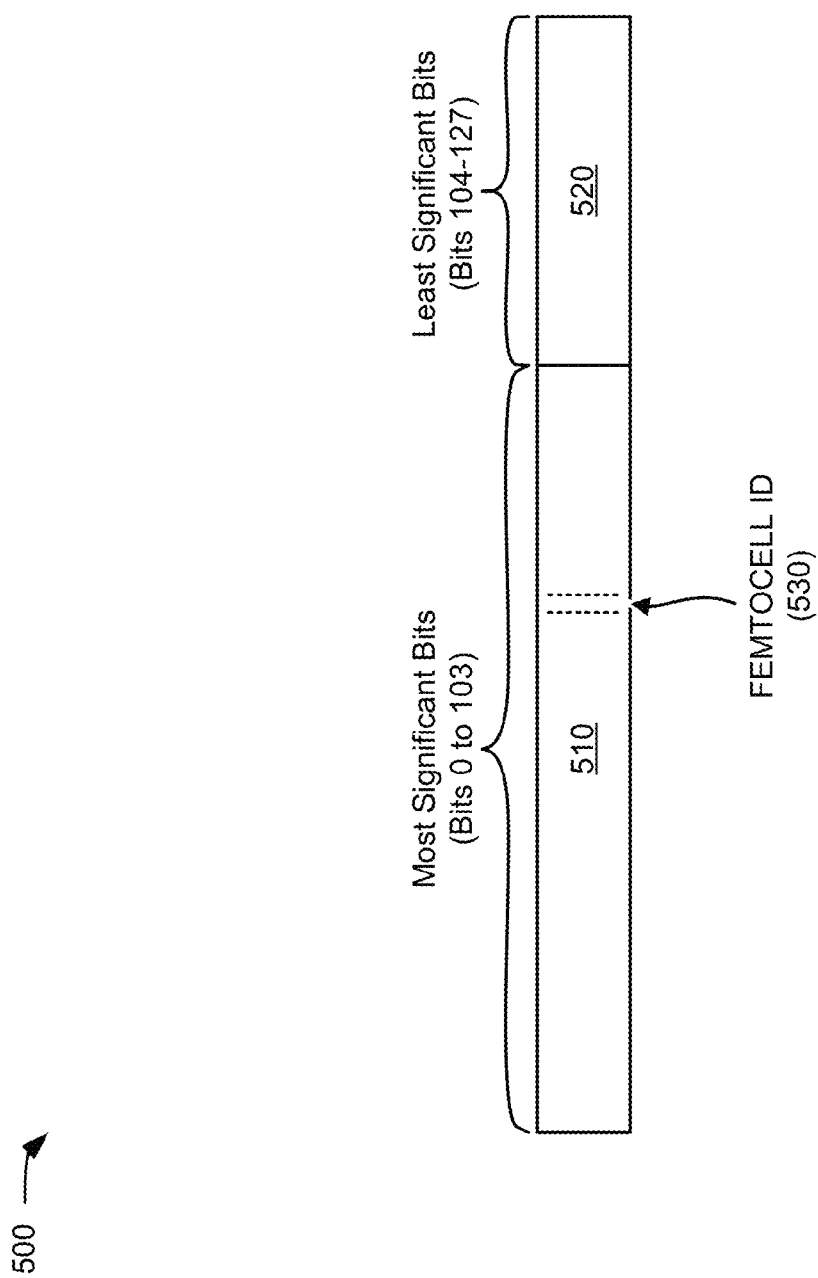
FIG. 5 is a diagram of an example format for a unicast access terminal identifier (UATI) according to an implementation described herein.

FIG. 5 depicts an example UATI format 500 according to an implementation described herein. UATI format 500 may include a most significant bits (MSB) section 510 and a least significant bits (LSB) section 520. A femtocell identifier section 530 may be included, for example, within MSB section 510.

MSB section 510 may include "n" most significant bits (MSBs) that represent the identifier for a subnet. In one implementation, MSB section 510 may include 104 bits (e.g., bit numbers 0-103). Least significant bits (LSB) section 520 may include the remaining "128-n" bits that identify a particular sector/device within a subnet. For example, LSB section 520 may include 24 bits (e.g., bit numbers 104-127).

Femtocell identifier (ID) section 530 may be a particular number and location of bits designated for identifying femtocell use. In one implementation, femtocell ID section 530 may include bits 48 and 49 as dedicated femtocell indicator bits. For example, all femtocells may use the same predefined two-bit pattern (e.g., "01") in femtocell ID section 530 to uniquely identify themselves as femtocells. Thus, a UATI provided to mobile device 110 from femtocell 140 may include the predefined two-bit pattern in femtocell ID section 530. Conversely, a UATI provided to mobile device 110 from base station 130 may include a different bit or set of bits in femtocell ID section 530.

Although FIG. 5 shows an example UATI format 500, in other implementations, UATI format 500 may include fewer sections, different sections, differently arranged sections, and/or additional sections than depicted in FIG. 5.

Figure 6:
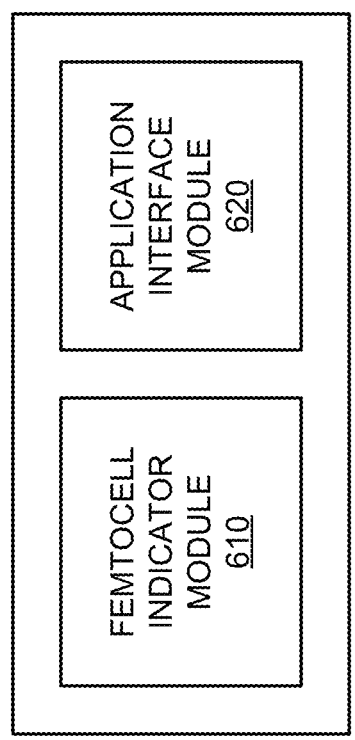
FIG. 6 is a diagram of example functional components of a mobile device depicted in FIG. 1.

FIG. 6 is a diagram of example functional components of mobile device 110. In one implementation, the functions described in connection with FIG. 6 may be performed by one or more components of device 300 (FIG. 3). As shown in FIG. 6, mobile device 110 may include a femtocell indicator module 610 and an application interface module 620.

Femtocell indicator module 610 may include hardware or a combination of hardware and software that may enable mobile device 110 to recognize a femtocell identifier and to provide an indication to a user. In one implementation, when mobile device 110 registers with a femtocell, femtocell indicator module 610 may receive, from femtocell 140, a UATI that includes a particular femtocell identifier (e.g., a two-bit identifier in femtocell identifier section 530). Femtocell indicator module 610 may parse the UATI to detect the femtocell identifier (included, for example, at bits 48 and 49 of the UATI).

Based on the detection or absence of the femtocell identifier, mobile device 110 may apply settings for specific behaviors (e.g., femtocell-specific behavior or macro cell-specific behavior). Mobile device 110 behaviors may include, for example, informing a user of mobile device 110 of a femtocell connection or a macro cell connection, notifying the user of pricing plan changes based on a femtocell or macro cell connection, and/or managing particular data transfers based on the femtocell or macro cell connection. In one implementation, for example, femtocell indicator module 610 may initiate display of a femtocell indicator icon for presentation to user whenever mobile device 110 is connected to a femtocell. An example of a user interface including a femtocell indicator icon is shown in FIG. 7.

Figure 7:
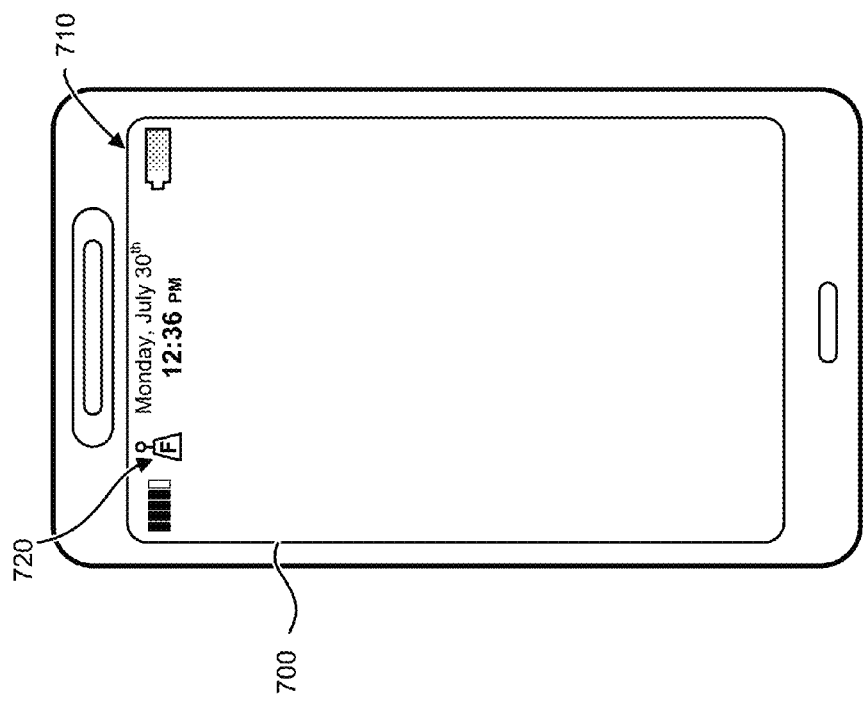
FIG. 7 is an example of a user interface including a femtocell use indicator icon.

As shown in FIG. 7, mobile device 110 may include a display 700 that includes a user interface 710. User interface 710 may present status information regarding mobile device 110, such as signal strength, battery life, date/time, and/or network connectivity. In an implementation described herein, user interface 710 may include a femtocell indicator 720. Femtocell indicator 720 may be presented (e.g., by femtocell indicator module 610) in the form of a distinct visual icon. In one implementation, femtocell indicator 720 may simply provide notice to a user that current network coverage for mobile device 110 is provided by a femtocell. Thus, in the event a network service provider offers different service/pricing options for femtocell use and macro cell use, a user of mobile device 110 may be able to make an informed decision selecting available services.

For example, assume a user has a subscription plan with a network service provider that is designed to promote femtocell use. Assume the subscription plan includes a per megabyte (MB) charge for data transfer using a macro base station (e.g., base station 130) and no charge (e.g., unlimited transfers) for data transfer using a femtocell (e.g., femtocell 140). Femtocell indicator 720 may provide information to a user of mobile device 110 to enable the user to make informed choices between the available subscription plan services.

Returning to FIG. 6, femtocell indicator module 610 may continue to display the femtocell indicator icon as long as mobile device 110 remains associated with femtocell 140. When mobile device 110 moves out of range of femtocell 140, indicator module 610 may receive a new UATI that may include another femtocell identifier (e.g., the same two-bit femtocell identifier, associated with another femtocell) or no femtocell identifier (e.g., indicating the UATI is from a macro base station). If a femtocell identifier is included in the new UATI, femtocell indicator module 610 may, for example, continue to present the femtocell indicator icon. If no femtocell identifier is included in the new UATI, femtocell indicator module 610 may remove the femtocell indicator icon from the display.

Application interface module 620 may include hardware or a combination of hardware and software that may enable mobile device 110 to recognize a femtocell identifier and to control communications to/from mobile device 110 based on the femtocell identifier. In one implementation, application interface module 620 may identify a call for a data session that is initiated by mobile device 110 (e.g., by a particular application running on mobile device 110) and apply specific behavior for the data session based on the presence (or absence) of the femtocell identifier. In an example implementation, application interface module 620 may be included as part of an operating systems (OS) and provide a TCP/IP stack to manage communication applications.

In an implementation, application interface module 620 may retrieve (e.g., from account server 160) and/or store information about a user's data subscription plan and/or subscription profile. For example, the account data may include information about a subscriber's billing plan for data (e.g., per MB fees, pre-paid MB limits, unlimited access, etc.). In one implementation, the subscriber's billing plan may include, for example, shared data limits among multiple devices (e.g., a "family plan"). Updates to a subscriber's account data may be requested by mobile device 110 during a session initiation exchange. Additionally, or alternatively, updates to a subscriber's account data may be initiated by, for example, account server 160, when a subscriber's billing plan is changed.

Application interface module 620 may provide pricing notifications for activity with different access networks. For example, if the user's subscription plan includes distinctions between data transfers using a femtocell (e.g., femtocell 140) versus a base station (e.g., base station 130), application interface module 620 may provide a general notification, to the user, of data transfer costs based on the current access network. The general notification may include, for example, an indication, when the UATI is received, that macro cell or femtocell pricing may be applied. In another implementation, the general notification may include actual data rates (e.g., a per MB rate) associated with the current access network. Pricing plan information may be obtained, for example, from account server 160 in advance and stored in a memory of mobile device 110.

Application interface module 620 may also track data usage for particular data session. In one implementation, application interface module 620 may monitor data transfers that may be initiated by an application running on mobile device 110. For example, application interface module 620 may identify when an application requests a data transfer using a service with pre-paid data transfer limits and/or per MB fees. In one implementation, application interface module 620 may notify a user of mobile device 110 that an application is consuming resources of a limited data service (e.g., per MB fees, pre-paid MB limits, etc.) associated with an access network for base station 130. Similarly, application interface module 620 may notify a user of mobile device 110 that an application is consuming resources under a particular billing rate (e.g., per MB fees, pre-paid MB limits, etc.) associated with an access network for femtocell 140. Conversely, application interface module 620 may provide no notice to the user of mobile device 110 if the application is consuming resources of an unlimited data service associated with an access network (e.g., for femtocell 140).

Figure 8:
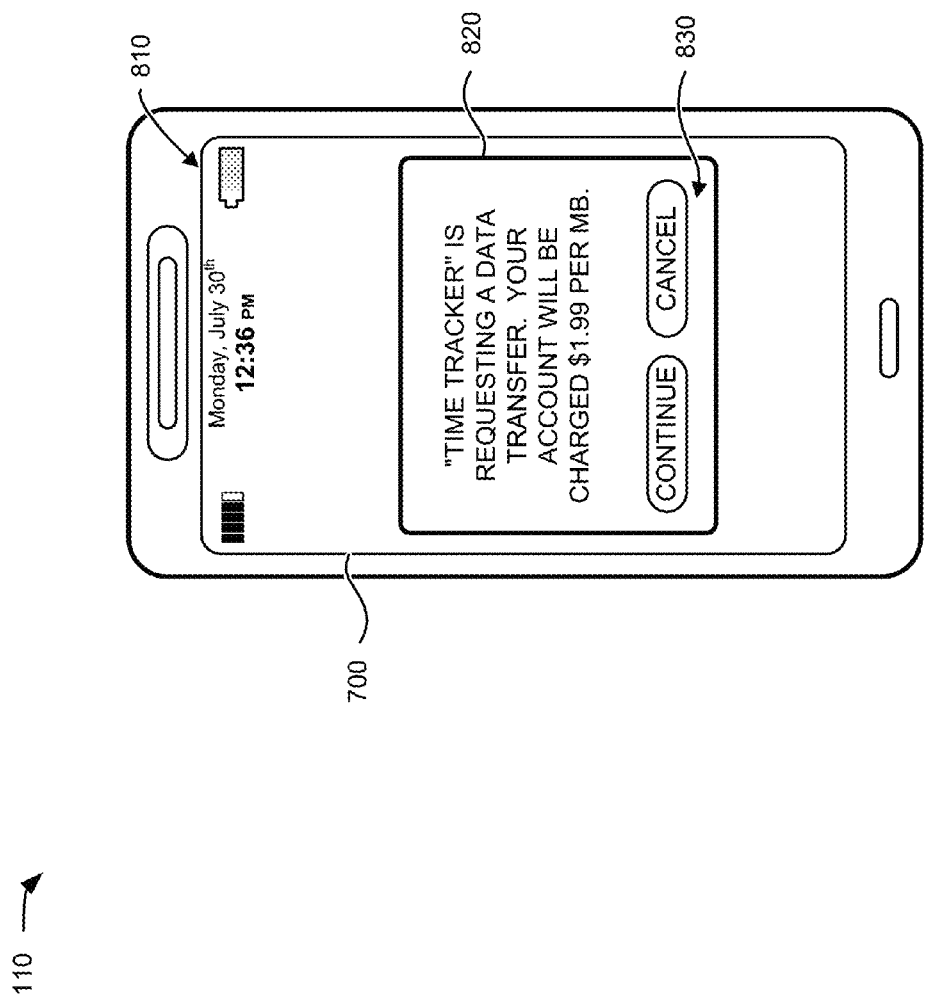
FIG. 8 is an example of another user interface including a notice of data usage.

FIG. 8 includes an example of another user interface including a notice of data usage. As shown in FIG. 8, mobile device 110 may include display 700 that includes a user interface 810. User interface 810 may include status information similar to that described in connection with user interface 710 above, with the exception that user interface 810 may not include a femtocell indicator 720. User interface 810 may also include a notice 820 to inform a user of mobile device 110 that an application is attempting to consume resources of a limited data service. Notice 820 may include, for example, information that is specific to a subscriber's account, such as the per MB cost, the amount of pre-paid MBs (e.g., total per month or currently remaining), etc.

As shown in FIG. 8, notice 820 may include a name of an application associated with a data request and the general charges associated with the request (e.g., "'Time Tracker' is requesting a data transfer. Your account will be charged $1.99 per MB."). In another implementation, notice 820 may include more generic information, such as simply indicating that a data transfer using a macro base station has been requested, stating that there may be a fee for the pending data transfer, etc. In one implementation, notice 820 may also include control buttons 830 to allow a user to permit (e.g., "continue") or stop (e.g., "cancel") a data transfer.

Figure 9:
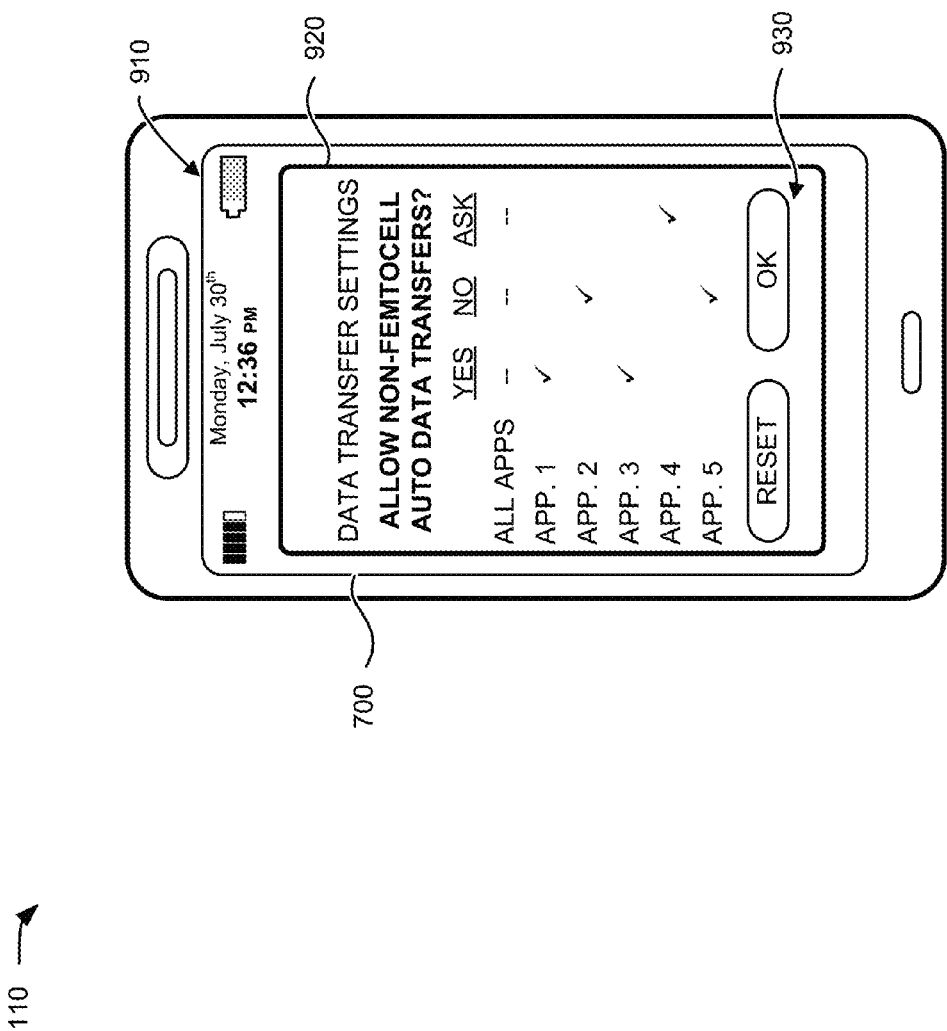
FIG. 9 is an example configuration menu for managing data transfers.

Returning to FIG. 6, application interface module 620 may also include user configurable setting to instruct mobile device 110 how to manage data transfers for particular applications when using a femtocell (e.g., femtocell 140) versus a macro cell base station (e.g., base station 130). For example, application interface module 620 may present configurable settings for encouraging lower cost data transfers (e.g., when mobile device 110 is connected to a femtocell) for non-critical applications, while restricting and/or notifying users of higher cost data transfers (e.g., when mobile device 110 is connected to a macro cell base station). In one implementation, configuration settings may include default settings that may be adjusted by a user. In another implementation, the configuration settings may vary based on pricing plan information received, for example, from account server 160. FIG. 9 provides a sample configuration menu for managing data transfers.

As shown in FIG. 9, mobile device 110 may include display 700 that includes a user interface 910. User interface 910 may include status information similar to that described in connection with user interfaces 710 and/or 810 above. User interface 910 may also include a configuration menu 920 to enable a user of mobile device 110 to manage data transfer settings for particular applications. In one implementation, configuration menu 920 may include a list of applications (or programs) residing on mobile device 110 (e.g., "App. 1," "App. 2," "App. 3," etc.). Additionally, or alternatively, configuration menu 920 may include groups of applications (e.g., "All Apps") and/or sub-groups of applications residing on mobile device 110.

In an example implementation, for each application or application group, configuration menu 920 may include configurable settings for managing data transfers when mobile device 110 is not connected to a femtocell. Settings may include, example, allowing data transfers for non-femtocell connections (e.g., "Yes"), disabling data transfers for non-femtocell connections (e.g., "No"), or notifying when a data transfer is requested via non-femtocell connections (e.g., "Ask"). In one implementation, configuration menu 920 may also include control buttons 930 to allow a user to return to a set of default configurations (e.g., "reset") or accept user selections (e.g., "OK").

While options in configuration menu 920 are presented in the context of particular applications or groups of applications, in other implementations configuration menu 920 may include different setting and/or categories. For example, configuration menu 920 may distinguish between data transfers initiated by a user and data transfers automatically initiated by an application. Configuration menu 920 is structured based on the presumption that services provided by a service provider may provide advantageous price plans for femtocell use over macro cell use. However, other configuration menus and options may be used.

FIGS. 6-9 show example functional components and user interfaces of mobile device 110. In other implementations, mobile device 110 may include fewer functional components, different functional components, differently arranged functional components, and/or additional functional components than depicted in FIG. 6. Alternatively, or additionally, one or more functional components of mobile device 110 may perform one or more other tasks described as being performed by one or more other functional components of mobile device 110. Furthermore, the example user interfaces presented in connection with FIGS. 7-9 may include different and/or differently arranged information.

Figure 10:
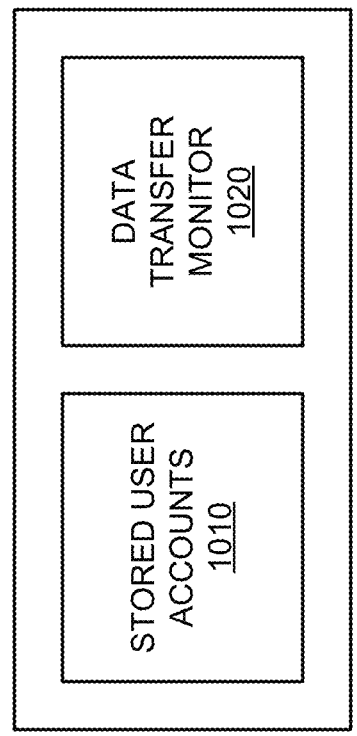
FIG. 10 is a diagram of example functional components of account server depicted in FIG. 1.

FIG. 10 is a diagram of example functional components of account server 160. In one implementation, the functions described in connection with FIG. 10 may be performed by one or more components of device 200 (FIG. 2). As shown in FIG. 10, account server 160 may include stored user accounts 1010 and a data transfer monitor 1020.

Stored user accounts 1010 may include account information associated with mobile device 110. For example, stored user accounts 1010 may include subscription information associated with each mobile device 110. Subscription information may include, for example, a level of subscription service (e.g., per MB fees, pre-paid MB limits, unlimited access, etc.) associated with the user account, femtocell and/or time-based pricing plans, order histories, user preferences, etc. In one implementation, select information from stored user accounts 1010 may be provided to mobile device 110 (e.g., application interface module 620) for use in controlling communications to/from mobile device 110 based on femtocell connectivity.

Data transfer monitor 1020 may include hardware or a combination of hardware and software to allow account server 160 to monitor data transfers to/from mobile device 110. In one implementation, data transfer monitor 1020 may differentiate between data transfers provided to/from mobile device 110 via a femtocell (e.g., femtocell 140) and data transfers provided to/from mobile device 110 via a macro cell base station (base station 130). Account server 160 may associate the monitored data transfer information with a user account (e.g., for the user of mobile device 110), store the data transfer information, and/or provide the data transfer information to a billing system (not shown). In one implementation, data transfers provided to/from mobile device 110 via a femtocell (e.g., femtocell 140) may be billed at a different rate than data transfers provided to/from mobile device 110 via a macro cell base station (base station 130). In another implementation, femtocell use may be incentivized by other plan structures, such as rewards programs, rebates, etc. based on femtocell use.

Although FIG. 10 shows example functional components of account server 160, in other implementations, account server 160 may include fewer functional components, different functional components, differently arranged functional components, and/or additional functional components than depicted in FIG. 10. Alternatively, or additionally, one or more functional components of account server 160 may perform one or more other tasks described as being performed by one or more other functional components of account server 160.

Figure 11:
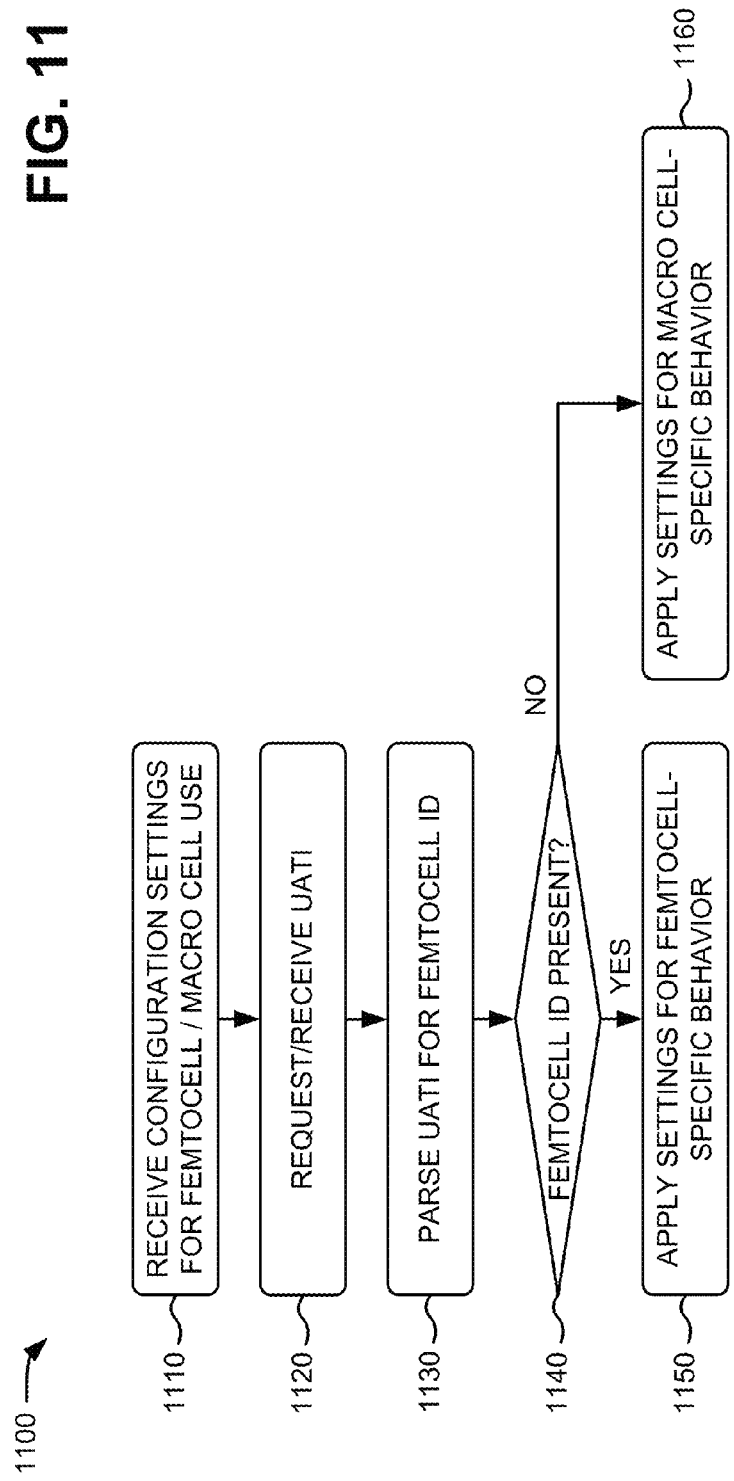
FIGS. 11-13 are a flow charts of an example process for managing mobile device behavior based on a femtocell indication according to an implementation described herein.
Figure 12:
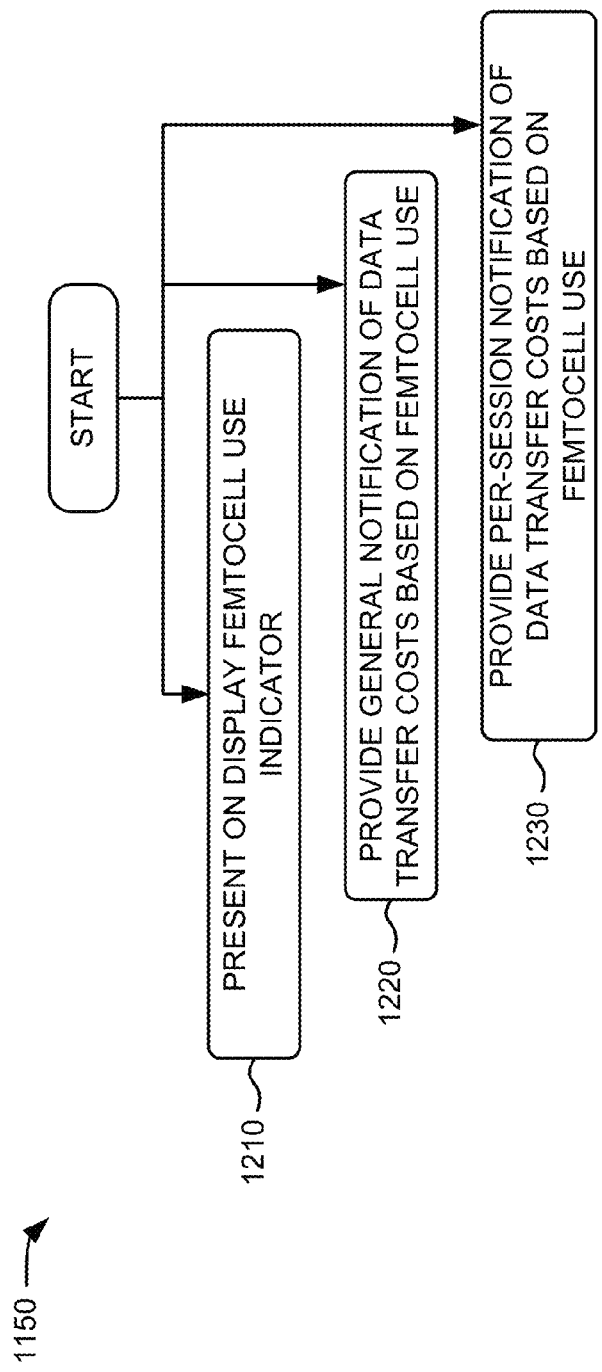
Figure 13:
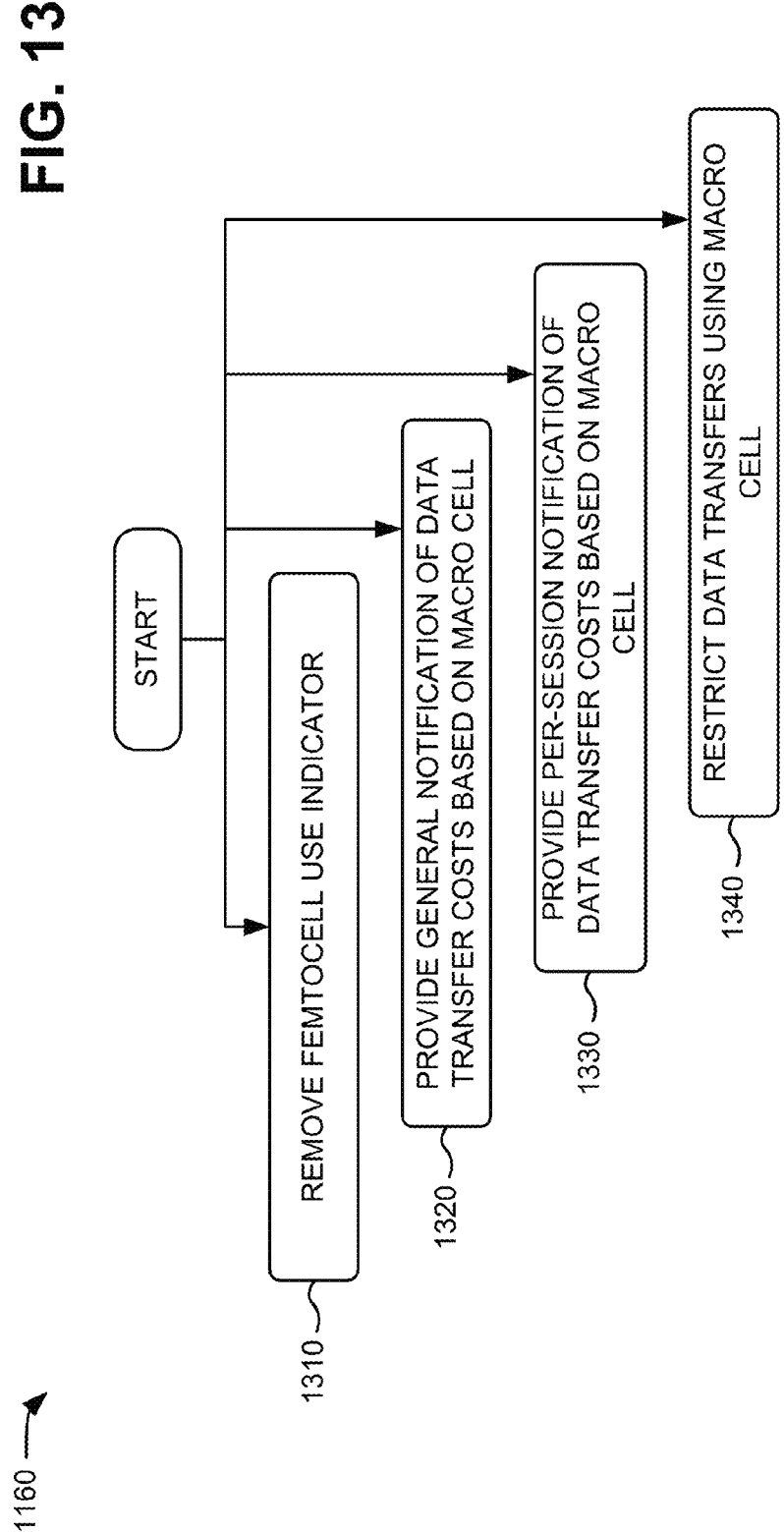

FIGS. 11-13 are flow charts of an example process 1100 for managing mobile device behavior based on a femtocell indication according to an implementation described herein. Process 1100 may be performed by mobile device 110. In another implementation, some or all of process 1100 may be performed by mobile device 110 in conjunction with, for example, account server 160.

Process 1100 may include receiving configuration settings for femtocell and/or macro cell use (block 1110). For example, as described above in connection with FIG. 6, application interface module 620 may include user configurable setting to instruct mobile device 110 how to manage data transfers for particular applications when using a femtocell (e.g., femtocell 140) versus a macro cell base station (e.g., base station 130). For example, application interface module 620 may present configurable settings for encouraging lower cost data transfers (e.g., when mobile device 110 is connected to a femtocell) for non-critical applications, while restricting and/or notifying users of higher cost data transfers (e.g., when mobile device 110 is connected to a macro cell base station). The configurable settings may vary based on pricing plan information received, for example, from account server 160.

Process 1100 may include requesting and receiving a UATI (block 1120), parsing the UATI for a femtocell identifier (block 1130), and determining if a femtocell identifier is present in the UATI (block 1140). For example, as described above in connection with FIG. 6, when mobile device 110 registers with a femtocell, femtocell indicator module 610 may receive, from femtocell 140, a UATI that includes a particular femtocell identifier (e.g., a two-bit identifier in femtocell identifier section 530). Femtocell indicator module 610 may parse the UATI to detect the femtocell identifier (included, for example, at bits 48 and 49 of the UATI).

If a femtocell identifier is detected (block 1140—YES), process 1100 may include applying settings for femtocell specific behavior (block 1150). For example, as described above in connection with FIG. 6, based on recognition of the femtocell identifier, mobile device 110 may apply settings for femtocell-specific behavior. Femtocell-specific behavior may include, for example, informing a user of mobile device 110 of a femtocell connection, notifying the user of pricing changes based on the change from a macro cell connection to a femtocell connection, and/or managing particular data transfers based on the femtocell connection.

If a femtocell identifier is not detected (block 1140—NO), process 1100 may include applying settings for macro cell-specific behavior (block 1160). For example, when mobile device 110 receives a UATI without a femtocell identifier, mobile device 110 may apply settings for macro cell-specific behavior. Macro cell-specific behavior may include, for example, removing a femtocell indicator (e.g., if mobile device 110 was previously connected to a femtocell), notifying the user of pricing changes based on the change from a femtocell connection to a macro cell connection, and/or managing particular data transfers based on the macro cell connection.

Process block 1150 may include the process blocks depicted in FIG. 12. As shown in FIG. 12, process block 1150 may include presenting, on a display, a femtocell use indicator (block 1210), providing a general notification of data transfer costs based on the femtocell use (block 1220), and/or providing a per-session notification of data transfer costs based on the femtocell use (block 1230). For example, femtocell indicator module 610 may initiate display of a femtocell indicator icon (e.g., femtocell indicator 720) for presentation to a user whenever mobile device 110 is connected to a femtocell. If the user's subscription plan includes distinctions between data transfers using a femtocell (e.g., femtocell 140) versus a macro cell base station (e.g., base station 130), application interface module 620 may provide a general notification, to the user, of data transfer costs based on the femtocell connection. Application interface module 620 may also track data usage for particular data session, such as data transfers that may be initiated by an application running on mobile device 110. Application interface module 620 may notify a user of mobile device 110 that an application is consuming resources of a limited data service (e.g., per MB fees, pre-paid MB limits, etc.) associated with, for example, an access network for femtocell 140. Similarly, application interface module 620 may notify a user of mobile device 110 that an application is consuming resources under a particular billing rate (e.g., per MB fees, pre-paid MB limits, etc.) associated with an access network for femtocell 140.

Process block 1160 may include the process blocks depicted in FIG. 13. As shown in FIG. 13, process block 1160 may include removing a femtocell use indicator (block 1310), providing a general notification of data transfer costs based on the macro cell use (block 1320), providing a per-session notification of data transfer costs based on the macro cell use (block 1330), and/or restricting data transfers using the macro cell (block 1340).

For example, when mobile device 110 moves out of range of femtocell 140, indicator module 610 may receive a new UATI that may not include a femtocell identifier (e.g., indicating the UATI is from a macro base station). If no femtocell identifier is included in the new UATI, femtocell indicator module 610 may remove the femtocell indicator icon from the display. If the user's subscription plan includes distinctions between data transfers using a femtocell (e.g., femtocell 140) versus a base station (e.g., base station 130), application interface module 620 may provide a general notification, to the user, of data transfer costs based on the macro cell connection. Application interface module 620 may also notify a user of mobile device 110 that an application is consuming (or attempting to consume) resources of a limited data service (e.g., per MB fees, pre-paid MB limits, etc.) associated with, for example, an access network for macro cell base station 130. Similarly, application interface module 620 may notify a user of mobile device 110 that an application is consuming resources under a particular billing rate (e.g., per MB fees, pre-paid MB limits, etc.) associated with an access network for macro cell base station 130.

Figure 14:
FIG. 14 is a flow chart of an example process for providing femtocell use identification according to an implementation described herein.

FIG. 14 is a flow chart of an example process 1400 for providing femtocell use identification according to an implementation described herein. Process 1400 may be performed by femtocell 140. In another implementation, some or all of process 1400 may be performed by femtocell 140 in conjunction with, for example, mobile device 110 and/or account server 160.

Process 1400 may include receiving a user account profile (block 1410) and sending the user account profile to a mobile device (block 1420). For example, account server 160 may receive and store account information associated with mobile devices 110. Account information may include, for example, pricing plan information that differentiates between femtocell usage and macro cell usage. In one implementation, some of the account information may be provided (e.g., via base station 130 or femtocell 140) to mobile device 110 to enable mobile device 110 to identify differences in pricing for femtocell usage and macro cell usage.

Process 1400 may also include receiving a UATI request (block 1430), obtaining a UATI with a femtocell ID (block 1440), and sending, to the mobile device, a UATI with the femtocell ID (block 1450). For example, mobile device 110 may send a UATI request message that may be received by a corresponding femtocell 140. Femtocell 140 may, in turn, request a UATI from PCF 125. In response to the UATI request, PCF 125 (e.g., UATI generator 410) may assign, to mobile device 110, a unique UATI that includes a femtocell identifier. PCF 125 may send the UATI to femtocell 140 which may provide the UATI to mobile device 110. In one implementation, the femtocell identifier may be a two-bit value common to all femtocell identifiers within a service provider's network. The femtocell identifier may be included within a particular location of the UATI so that mobile device 110 may detect the femtocell identifier and, for example, notify a user that mobile device 110 is connected to a femtocell (e.g., in contrast to a macro cell).

Systems and/or methods described herein may send a request for a unique wireless network session identifier and may receive, based on the request, the unique wireless network session identifier. The systems and/or methods may determine whether the unique wireless network session identifier includes a femtocell identifier. The systems and/or methods may apply one set of configuration settings when the unique wireless network session identifier includes the femtocell identifier, and may apply a different set of configuration settings when the unique wireless network session identifier does not include the femtocell identifier.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 11-14, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a mobile device, first configuration settings for the mobile device to conduct first data transfers via a macro cell base station and second configuration settings for the mobile device to conduct second data transfers via a femtocell,
   the first configuration settings being different from the second configuration settings,
   the first configuration settings including:
      one or more first settings for first particular data transfers, of the first data transfers, initiated by a user, and
      one or more second settings for second particular data transfers, of the first data transfers, initiated by an application,
   the one or more second settings being different from the one or more first settings, and
   the first configuration settings and the second configuration settings varying based on plan information;
   providing, by the mobile device, a unicast access terminal identifier (UATI) request;
   receiving, by the mobile device, a UATI based on the UATI request;
   determining, by the mobile device, whether the UATI includes a femtocell identifier that indicates that the mobile device is connected to the femtocell; and
   applying, by the mobile device and based on determining whether the UATI includes the femtocell identifier, one or more of the first configuration settings or one or more of the second configuration settings.

2. The method of claim 1, where the UATI request is sent to one of:
   the macro cell base station, or
   the femtocell.

3. The method of claim 1, where the UATI includes dedicated femtocell indicator bits.

4. The method of claim 3, where the dedicated femtocell indicator bits include a two-bit pattern associated with a plurality of femtocells within a network that includes the femtocell.

5. The method of claim 1, where applying the second configuration settings for data transfers via the femtocell includes one or more of:
   providing, for presentation on a display of the mobile device, a femtocell use indicator;

providing a notification of a pricing plan associated with data transfers via the femtocell; or providing a notification of pricing associated with a particular data transfer session via the femtocell.

6. The method of claim 1, where applying the first configuration settings for data transfers via the macro cell base station includes one or more of:

removing, from a display of the mobile device, a femtocell use indicator;

providing a notification of a pricing plan associated with data transfers via the macro cell base station;

providing a notification of pricing associated with a particular data transfer session via the macro cell base station; or restricting the particular data transfer session via the macro cell base station.

7. The method of claim 1, further comprising:

receiving, from an account server, an account profile, associated with the mobile device, that identifies a pricing plan associated with data transfers via the macro cell base station and a pricing plan associated with data transfers via the femtocell, and presenting information based on the account profile.

8. The method of claim 1, where the macro cell base station and the femtocell are part of an Evolution-Data Optimized (EVDO) network.

9. A mobile device comprising:

a processor, coupled to a memory, to:

receive a first set of configuration settings that are to be applied by the mobile device to conduct first data transfers when the mobile device is connected to a macro cell base station and a second set of configuration settings that are to be applied by the mobile device to conduct second data transfers when the mobile device is connected to a femtocell, the first set of configuration settings being different from the second set of configuration settings, the first set of configuration settings including:

one or more first settings for first particular data transfers, of the first data transfers, initiated by a user, and one or more second settings for second particular data transfers, of the first data transfers, initiated by an application, the one or more second settings being different from the one or more first settings, and the first set of configuration settings and the second set of configuration settings varying based on plan information;

send a request for a unique wireless network session identifier;

receive, based on the request, the unique wireless network session identifier;

determine whether the unique wireless network session identifier includes a femtocell identifier that indicates that the mobile device is connected to the femtocell; and apply, based on determining whether the unique wireless network session identifier includes the femtocell identifier, one or more of the first set of configuration settings or one or more of the second set of configuration settings.

10. The mobile device of claim 9, where the first set of configuration settings and the second set of configuration settings are based on input provided by a user of the mobile device.

11. The mobile device of claim 9, where the request for the unique wireless network session identifier is sent to one of:

the macro cell base station, or the femtocell.

12. The mobile device of claim 9, where the mobile device includes one or more of:

a radiotelephone, a personal communications system (PCS) terminal, a personal digital assistant (PDA), a wireless device, a smart phone, a laptop computer, or a global positioning system (GPS) device.

13. The mobile device of claim 9, where the macro cell base station and the femtocell are part of an Evolution-Data Optimized (EVDO) network.

14. The mobile device of claim 9, where the unique wireless network session identifier includes dedicated femtocell indicator bits.

15. The mobile device of claim 14, where the dedicated femtocell indicator bits include a two-bit pattern associated with a plurality of femtocells within a network that includes the femtocell.

16. The mobile device of claim 9, where the first set of configuration settings includes presenting, on a display of the mobile device, a femtocell use indicator that indicates, to a user of the mobile device, that the mobile device is connected to a wireless network via the femtocell.

17. A non-transitory computer readable medium comprising:

one or more instructions which, when executed by a processor of a mobile device, cause the processor to:

receive a first set of configuration settings that are to be applied by the mobile device to conduct first data transfers when the mobile device is connected to a macro base station and a second set of configuration settings that are to be applied by the mobile device to conduct second data transfers when the mobile device is connected to a femtocell, the first set of configuration settings being different from the second set of configuration settings, the first set of configuration settings including:

one or more first settings for first particular data transfers, of the first data transfers, initiated by a user, and one or more second settings for second particular data transfers, of the first data transfers, initiated by an application, the one or more second settings being different from the one or more first settings, and the first set of configuration settings and the second set of configuration settings varying based on plan information;

receive a particular identifier;

determine that the particular identifier includes a femtocell identifier that indicates that the mobile device is connected to the femtocell; and apply, based on determining whether the particular identifier includes the femtocell identifier, one or more of the first set of configuration settings or one or more of the second set of configuration settings.

18. The non-transitory computer readable medium of claim 17, where the femtocell identifier includes a two-bit pattern associated with a plurality of femtocells that include the femtocell.

19. The non-transitory computer readable medium of claim 17, further comprising:
    one or more instructions to:
        provide, for presentation and after determining that the particular identifier includes the femtocell identifier, information regarding pricing changes based on a change from the first data transfers via the macro base station to the second data transfers via the femtocell.

20. The non-transitory computer readable medium of claim 17, where the particular identifier is a unicast access terminal identifier (UATI).

\* \* \* \* \*